US011868690B1

(12) United States Patent
Hou et al.

(10) Patent No.: US 11,868,690 B1
(45) Date of Patent: Jan. 9, 2024

(54) METHOD, DEVICE, ELECTRONIC EQUIPMENT AND MEDIUM FOR ANALYZING DISASTER PREVENTION AND MITIGATION EFFECTIVENESS OF ECOLOGICAL SEAWALL

(71) Applicant: Pearl River Water Resources Research Institute, Guangzhou (CN)

(72) Inventors: Peng Hou, Guangzhou (CN); Xiaozhang Hu, Guangzhou (CN); Xiaojian Liu, Guangzhou (CN); Xiaowei Zhu, Guangzhou (CN); Qisong Wang, Guangzhou (CN); Qiang Wang, Guangzhou (CN); Cheng Liu, Guangzhou (CN); Xia Liu, Guangzhou (CN); Shijun Wang, Guangzhou (CN); Huiqun Guo, Guangzhou (CN); Qinqin Liu, Guangzhou (CN); Chenqi Zhou, Guangzhou (CN); Honglu Yue, Guangzhou (CN); Zhongjie Deng, Guangzhou (CN); Jingyi Li, Guangzhou (CN)

(73) Assignee: Pearl River Water Resources Research Institute, Guangdong (CN)

( * ) Notice: Subject to any disclaimer, the term of this patent is extended or adjusted under 35 U.S.C. 154(b) by 0 days.

(21) Appl. No.: 18/458,829

(22) Filed: Aug. 30, 2023

(51) Int. Cl.
  *G06F 30/28* (2020.01)
  *G06F 113/08* (2020.01)
  *G06F 111/10* (2020.01)

(52) U.S. Cl.
  CPC .......... *G06F 30/28* (2020.01); *G06F 2111/10* (2020.01); *G06F 2113/08* (2020.01)

(58) Field of Classification Search
  CPC ... G06F 30/28; G06F 2111/10; G06F 2113/08
  See application file for complete search history.

(56) References Cited

U.S. PATENT DOCUMENTS

| 7,461,998 | B1 | 12/2008 | Parnell | |
| 2014/0303948 | A1* | 10/2014 | Williams | G06F 30/20 703/6 |
| 2020/0080244 | A1* | 3/2020 | Ghossein | D04H 1/732 |

FOREIGN PATENT DOCUMENTS

| CN | 103544342 | 1/2014 |
| CN | 114510765 | 5/2022 |

OTHER PUBLICATIONS

Jiang et al., "Numerical Investigation of Tsunami-Like Solitary Wave Interaction with a Seawall", Journal of Earthquake and Tsunami · Nov. 2016 (Year: 2016).*

(Continued)

*Primary Examiner* — Jack Chiang
*Assistant Examiner* — Brandon Bowers
(74) *Attorney, Agent, or Firm* — Piloff Passino & Cosenza LLP; Sean A. Passino; Rachel K. Pilloff

(57) ABSTRACT

A method for analyzing disaster prevention and mitigation effectiveness of an ecological seawall is provided, including: performing seawall ecologicalization on a target seawall; establishing three-dimensional space hydrodynamic force for the target ecological seawall; simulating wave climbing on a dike body and a wave overtopping on a dike top of the target ecological seawall to obtain a wave overtopping index; calculating wave-flow bottom shear stress of the target ecological seawall, establishing a sediment movement model, and calculating suspended load and bed load sediment transportation volumes; calculating the change index of coastal bed surface according to the suspended load and bed load sediment transportation volumes, and determining a development index of tidal flats in front of dike of the target ecological seawall according to the change index; and calculating the disaster prevention and mitigation effective- (Continued)

ness grade of the target ecological seawall according to the wave overtopping index and the development index.

9 Claims, 6 Drawing Sheets

(56) References Cited

OTHER PUBLICATIONS

Notification to Grant Patent Right for Invention from SIPO dated Oct. 24, 2022 in CN application No. 202211062126.2.
Supplemental Retrieval report from SIPO dated Oct. 21, 2022 in CN application No. 202211062126.2.
Retrieval report from SIPO dated Oct. 8, 2022 in CN application No. 202211062126.2.
Liu Xujie et al., "Numerical Simulation of Hydrodynamics on Coastal Sand Bed Based on OpenFOAM" The 11th issue of Water Transport Engineering, pp. 7-12, dated Nov. 30, 2019 (abstract translated).
Cao Yonggang et al., "Analysis of flow structure around submarine pipeline based on local scour", Science, Technology and Engineering, vol. 15, Issue 01, pp. 8-16, dated May 31, 2015 (abstract translated on last page).
Liu Cheng et al. "Mitigation Effect Study of tidal sluice building in the Bailong river of Pearl river estuary", Marine Forecasts, vol. 33, Issue 1, pp. 65-70, dated Feb. 28, 2016 (Translation of abstract on last page).
Zhang Hua et al., "Ecological Engineering Based Adaptive coastal defense strategy to global change", Advances in Earth Science, vol. 30, No. 09, pp. 996-1005, dated Sep. 30, 2015 (abstract translated on last page).
Shu Ye-Hua, et al., "Comparison of calculation methods for overtopping of Shu Yehua and other compound seawall structures", "Water Transport Engineering" No. 05, pp. 36-40 dated May 31, 2019.
Notice of the First Office action from SIPO dated Oct. 12, 2022 in CN application No. 202211062126.2.

\* cited by examiner

METHOD, DEVICE, ELECTRONIC EQUIPMENT AND MEDIUM FOR ANALYZING DISASTER PREVENTION AND MITIGATION EFFECTIVENESS OF ECOLOGICAL SEAWALL

CROSS-REFERENCE TO RELATED APPLICATIONS

This disclosure claims priority to Chinese Patent Application No. 202211062126.2, filed on Sep. 1, 2022, the contents of which are hereby incorporated by reference.

TECHNICAL FIELD

The disclosure relates to a technical field of hydraulic engineering, and in particular to a method, a device, electronic equipment and a computer-readable storage medium for analyzing a disaster prevention and mitigation effectiveness of an ecological seawall.

BACKGROUND

As economy is developed and people's living standards are improved, coastal areas become the first choice for people to travel and spend holidays. However, in order to protect the environment of the ecological seawall and improve disaster prevention and mitigation effectiveness of the ecological seawall, all aspects of the ecological seawall need to be evaluated in order to evaluate the disaster prevention and mitigation effectiveness of the ecological seawall.

At present, the existing analysis methods on the disaster prevention and mitigation effectiveness of the ecological seawall are mostly carried out and applied by using new materials and technologies through the evaluation system of ecological priority. For example, coastline management practices may be carried out through plants, stones and other organic structural materials. However, in practical application, the submerged breakwater, the shoal in front of the seawall and the breakwater body of the ecological seawall affects the disaster prevention and mitigation effectiveness of the ecological seawall. Considering only a single influencing factor, the evaluation of the disaster prevention and mitigation effectiveness of the ecological seawall may be too one-sided, so the disaster prevention and mitigation effectiveness of the ecological seawall is low.

SUMMARY

The disclosure provides a method, a device and a computer-readable storage medium for analyzing a disaster prevention and mitigation effectiveness of an ecological seawall, so as to solve a problem of the low disaster prevention and mitigation effectiveness of the ecological seawall.

In order to achieve the above purpose, the method for analyzing the disaster prevention and mitigation effectiveness of the ecological seawall provided by the disclosure includes following steps:

S1, performing a seawall ecologicalization on a target seawall by using preset vegetations, environment-friendly materials and ecological engineering methods to obtain a target ecological seawall;

S2, establishing three-dimensional space hydrodynamic force for the target ecological seawall by using a preset Navier-Stokes equation and a preset PIMPLE algorithm, where the establishing the three-dimensional space hydrodynamic force for the target ecological seawall by using the preset Navier-Stokes equation and the preset PIMPLE algorithm includes following steps:

S21, obtaining a drag force and an inertia force of a plant population of the target ecological seawall;

S22, filtering the Navier-Stokes equation with a three-dimensional incompressibility according to a preset mass conservation law and a momentum conservation law, the drag force and the inertia force to obtain a control equation, where the control equation is:

$$\frac{\partial \langle \bar{u}_i \rangle}{\partial x_i} = 0$$

$$\frac{\partial \rho \langle \bar{u}_i \rangle}{\partial t} + \langle \bar{u}_j \rangle \frac{\partial \rho \langle \bar{u}_i \rangle}{\partial x_i} - \frac{\partial}{\partial x_j}\left[\langle u_{\mathit{eff}} \rangle \frac{\partial \langle \bar{u}_i \rangle}{\partial x_j}\right] = \frac{\partial \acute{p}}{\partial x_i} - g_i x_j \frac{\partial \rho}{\partial x_j} - \bar{F}_{D,i} - \bar{F}_{I,i};$$

where $\bar{u}_i$ represents a volume average velocity, $u_{\mathit{eff}}$ represents a volume average effective viscosity, $\acute{p}$ represents the volume average dynamic pressure, $\rho$ represents a volume average density, $\bar{F}_{D,i}$ represents the drag force and $\bar{F}_{I,i}$ represents the inertia force, where the drag force and the inertia force are used to consider momentum loss caused by the preset vegetations in this method;

S23, solving the control equation by using the PIMPLE algorithm to obtain a pressure field and a velocity field with a mass conservation;

S24, performing a grid area discretization on the control equation by using a finite volume method to obtain a grid cell area;

S25, setting a boundary condition for the grid cell area, and dividing the grid cell area into a wave-making area and a wave-absorbing area by using the boundary condition; and S26, establishing the three-dimensional space hydrodynamic force according to the pressure field, the velocity field, the wave-making area and the wave-absorbing area;

S3, carrying out a wave climbing simulation on a dike body and a wave overtopping simulation on a dike top of the target ecological seawall through the three-dimensional space hydrodynamic force to obtain a wave overtopping index;

S4, calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

S5, mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and S6, calculating a disaster prevention and mitigation effectiveness grade of the target ecological seawall according to the wave overtopping index and the development index of the tidal flats in front of dike.

Optionally, the carrying out the wave climbing simulation on the dike body and the wave overtopping simulation on the dike top of the target ecological seawall through the three-dimensional space hydrodynamic force to obtain the wave overtopping index includes:

calculating seepage empirical coefficients of the target ecological seawall by using a preset empirical formula of porous media:

$$\alpha = \frac{41p^2}{(1-p)^{2/3}\left(1-(1-p)^{1/3}\right)\left(1-(1-p)^{2/3}\right)}$$

$$\beta = \frac{p^2}{\left(1-(1-p)^{2/3}\right)^2};$$

where $\alpha$ represents a linear term coefficient in the seepage empirical coefficients, $\beta$ represents a nonlinear term coefficient in the seepage empirical coefficients, and p represents a porosity of a coastal bed surface;

carrying out the wave climbing simulation on the dike body of the target ecological seawall according to the seepage empirical coefficients through the three-dimensional space hydrodynamic force to obtain a wave climbing value;

carrying out the wave overtopping simulation on the dike top of the target ecological seawall through the three-dimensional space hydrodynamic force to obtain an average wave overtopping amount; and calculating a weighted wave overtopping index of the wave climbing value and the average wave overtopping amount by using a preset weighting algorithm, and taking the weighted wave overtopping index as the wave overtopping index.

Optionally, the calculating the wave-flow bottom shear stress of the target ecological seawall by using the preset coastal hydrodynamic model includes:

obtaining a roughness height of sediment particles, a roughness height of a sediment transport and a roughness height of a coastal bed surface form of the target ecological seawall;

calculating a roughness height of the wave-flow bottom of the target ecological seawall by using a preset roughness height formula according to the roughness height of the sediment particles, the roughness height of the sediment transport and the roughness height of the coastal bed surface form:

$h = h_s + h_b + h_f$;

where h represents the roughness height of the wave-flow bottom, $h_s$ represents the roughness height of the sediment particles, $h_b$ represents the roughness height of the sediment transport and $h_f$ represents the roughness height of the coastal bed surface form;

determining a pure water-flow bottom shear stress and a pure wave bottom shear stress according to the roughness height of the wave-flow bottom;

calculating the wave-flow bottom shear stress according to the pure water-flow bottom shear stress and the pure wave bottom shear stress by using a preset bottom shear stress formula:

$$\delta = \delta_s \left[1 + 1.2\left(\frac{\delta_z}{\delta_s + \delta_z}\right)^{3.2}\right];$$

where $\delta$ represents the wave-flow bottom shear stress, $\delta_s$ represents the pure water-flow bottom shear stress, and $\delta_z$ represents the pure wave bottom shear stress.

Optionally, the calculating the suspended load sediment transportation volume by using the preset convection-diffusion equation includes:

obtaining a sediment carrying volume and a water flow velocity in a water flow movement process;

calculating a sediment mass concentration in the water flow movement process by using the convection-diffusion equation according to the sediment carrying volume and the water flow velocity:

$$\frac{\partial B_A}{\partial \tau} + u_x \frac{\partial B_A}{\partial x} + u_y \frac{\partial B_A}{\partial y} + u_z \frac{\partial B_A}{\partial z} = \left(\frac{\partial^2 B_A}{\partial x^2} + \frac{\partial^2 B_A}{\partial y^2} + \frac{\partial^2 B_A}{\partial z^2}\right) + r_A;$$

where $r_A$ represents the sediment carrying volume, $B_A$ represents the sediment mass concentration, $\tau$ represents a water flow time, $u_x$ represents a water flow velocity in a direction of x, $u_y$ represents a water flow velocity in a direction of y, $u_z$ represents a water flow velocity in a direction of z, and $\partial$ represents a partial derivative function;

determining the suspended load sediment transportation volume according to the sediment mass concentration.

Optionally, the calculating the two-dimensional bed surface change index according to the suspended load sediment transportation volume and the bed load sediment transportation volume includes:

determining a sediment exchange volume in the vertical direction according to the suspended load sediment transportation volume;

determining the sediment transportation volume in the horizontal direction according to the bed load sediment transportation volume;

calculating a coastal bed surface change index according to the sediment exchange volume and the sediment transportation volume by using a preset coastal bed surface change formula:

$$C = (1-p)\frac{\partial h_k}{\partial 1} + f\left(\frac{\partial q_x}{\partial x} + \frac{\partial q_y}{\partial y} + E + D\right);$$

where C represents the coastal bed surface change index, p represents a porosity of the coastal bed surface, $h_k$ represents an elevation of the coastal bed surface, $\partial$ represents a partial derivative sign, f represents a terrain acceleration factor, 1 represents a time step, $q_x$ represents a bed load sediment transportation volume in the direction of x, $q_y$ represents a bed load sediment transportation volume in the direction of y, E represents the sediment exchange volume and D represents the sediment transportation volume.

Optionally, the determining the development index of the tidal flats in front of dike of the target ecological seawall by using the preset Exner equation according to the two-dimensional bed surface change index includes:

determining a bed surface change value of the target ecological seawall according to the two-dimensional bed surface change index;

calculating the development index of the tidal flats in front of dike of the target ecological seawall according to the bed surface change value by using the Exner equation:

$$\frac{\partial \eta}{\partial \Lambda} = -\frac{1}{1-p} \cdot q + \sigma;$$

where η represents the development index of the tidal flats in front of dike, Λ represents a tidal flat development time, p represents the porosity of the coastal bed surface, q represents the bed surface change value, a represents a constant, generally a positive value, and ∂ represents the partial derivative function.

Optionally, the calculating the disaster prevention and mitigation effectiveness grade of the target ecological seawall according to the wave overtopping index and the development index of the tidal flats in front of dike includes:

determining a first weight of the wave overtopping index and a second weight of the development index of the tidal flats in front of dike by using a preset analytic hierarchy process;

calculating a weighted mean of the first weight and the second weight by using a weighted mean algorithm; and determining the disaster prevention and mitigation effectiveness grade of the target ecological seawall according to the weighted mean.

In order to solve the above problems, the present disclosure also provides a device for analyzing the disaster prevention and mitigation effectiveness of the ecological seawall, the device for analyzing the disaster prevention and mitigation effectiveness of the ecological seawall includes:

a seawall ecologicalization module used for performing a seawall ecologicalization on a target seawall by using preset vegetations, environment-friendly materials and ecological engineering methods to obtain a target ecological seawall;

a three-dimensional space hydrodynamic force establishment module used for establishing three-dimensional space hydrodynamic force for the target ecological seawall by using a preset Navier-Stokes equation and a preset PIMPLE algorithm;

a wave overtopping index simulation module used for carrying out a wave climbing simulation on a dike body and a wave overtopping simulation on a dike top of the target ecological seawall through the three-dimensional space hydrodynamic force to obtain a wave overtopping index;

a wave-flow bottom shear stress calculation module used for calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

a development index determining module of tidal flats in front of dike used for mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and a disaster prevention and mitigation effectiveness grade calculation module used for calculating a disaster prevention and mitigation effectiveness grade of the target ecological seawall according to the wave overtopping index and the development index of the tidal flats in front of dike.

In order to solve the above problems, the present disclosure also provides electronic equipment, and the electronic equipment includes:

at least one processor; and a memory communicatively connected to the at least one processor; where the memory stores a computer program executable by the at least one processor, and the computer program is executed by the at least one processor, so that the at least one processor may execute the above-mentioned method for analyzing the disaster prevention and mitigation effectiveness of the ecological seawall.

In order to solve the above problems, the present disclosure also provides a computer-readable storage medium, where the computer-readable storage medium stores at least one computer program, and the at least one computer program is executed by the at least one processor in the electronic equipment to realize the above-mentioned method for analyzing the disaster prevention and mitigation effectiveness of the ecological seawall.

According to the embodiment, the seawall ecologicalization may be performed on the target ecological seawall, and then the three-dimensional space hydrodynamic force may be established for the target ecological seawall, and the wave climbing simulation on the dike body and the wave overtopping simulation on the dike top of the target ecological seawall may be carried out for the target ecological seawall through the three-dimensional space hydrodynamic force, so that the effectiveness and safety of the breakwater and revetment engineering may be measured according to the wave overtopping index, and a sediment movement model may be established according to the wave-flow bottom shear stress of the target ecological seawall, and after the sediment movement model is calculated, the suspended load sediment transportation volume and the bed load sediment transportation volume are transmitted to a terrain evolution model to determine the coastal bed surface change index, and then the development index of tidal flats in front of dike of the target ecological seawall is determined according to the coastal bed surface change index, and the disaster prevention and mitigation effectiveness grade of the target ecological seawall is judged according to the wave overtopping index and the development index of the tidal flats in front of dike, so that the disaster prevention and mitigation effectiveness of the target ecological seawall may be improved. Therefore, the method, the device, the electronic equipment and the computer-readable storage medium for analyzing the disaster prevention and mitigation effectiveness of the ecological seawall provided by the embodiment may solve the problem of the low efficiency in the disaster prevention and mitigation of the ecological seawall.

The realization, functional characteristics and advantages of the present disclosure are further described with reference to the attached drawings in combination with embodiments.

DETAILED DESCRIPTION OF THE EMBODIMENTS

It should be understood that the specific embodiments described here are only used to explain the disclosure, and are not used to limit the disclosure.

The embodiment of the application provides a method for analyzing a disaster prevention and mitigation effectiveness of an ecological seawall. The execution subject of the method for analyzing the disaster prevention and mitigation effectiveness of the ecological seawall includes, but is not limited to, at least one of electronic equipment such as servers and terminals that may be configured to execute the method provided by the embodiment of the disclosure. In other words, the method for analyzing the disaster prevention and mitigation effectiveness of the ecological seawall may be executed by a software or a hardware installed in terminal equipment or server equipment, and the software may be a blockchain platform. The server includes, but is not limited to, a single server, a server cluster, a cloud server or a cloud server cluster. The server may be an independent server or a cloud server providing basic cloud computing services such as cloud service, cloud database, cloud computing, cloud function, cloud storage, network service, cloud communication, middleware service, domain name service, security service, Content Delivery Network (CDN), big data and artificial intelligence platform.

Figure 1:
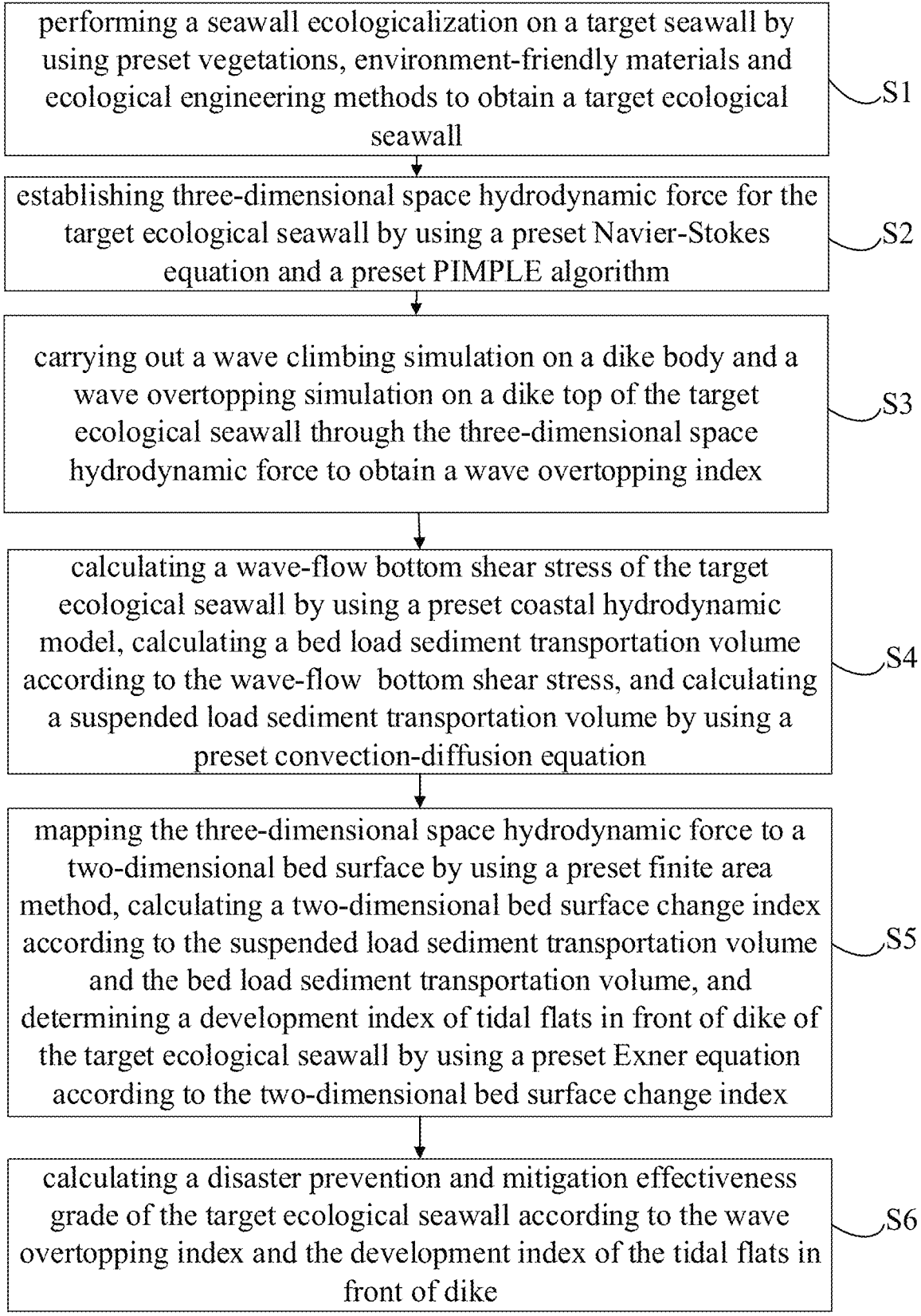
FIG. 1 is a schematic flow chart of a method for analyzing a disaster prevention and mitigation effectiveness of an ecological seawall provided by an embodiment of the present disclosure.

Referring to FIG. 1, it is a schematic flow chart of the method for analyzing the disaster prevention and mitigation effectiveness of the ecological seawall provided by an embodiment of the present disclosure. In this embodiment, the method for analyzing the disaster prevention and mitigation effectiveness of the ecological seawall includes following steps:

S1, performing a seawall ecologicalization on a target seawall by using preset vegetations, environment-friendly materials and ecological engineering methods to obtain a target ecological seawall;

in the embodiment of the disclosure, the seawall ecologicalization is to transform the existing seawall in combination with the vegetations, the environmentally friendly materials and the engineering methods, and improve the ecological connectivity and the ecological service functions of the existing seawall without reducing the physical protection ability. The ecological seawall includes three systems from sea to inland: submerged seawall, shoal in front of dike and dike body.

For example, green and environmentally friendly harmless materials suitable for local sea ecosystem should be adopted to facilitate plant growth and algae, and promote biodiversity recovery. Seawall slopes suitable for planting plants should be covered with the vegetations, and the back seawall slopes should be covered with the vegetations in a combination of shrub and grass on the premise of meeting the requirements of anti-scour of overtopping water bodies. The construction of the seawall ecologicalization should investigate and analyze local natural conditions such as hydrology, geology, topography and biology, optimize seawall engineering design, and take engineering and biological measures to mitigate adverse impacts of seawall construction on the ecosystem.

S2, establishing three-dimensional space hydrodynamic force for the target ecological seawall by using a preset Navier-Stokes equation and a preset PIMPLE algorithm;

in the embodiment of the disclosure, the Navier-Stokes equation is a motion equation describing the momentum conservation of viscous incompressible fluid, and is called N-S equation for short; a two-phase flow solver is a two-phase flow solver in the open source code of OpenFOAM, OpenFOAM is an open source software package of computational fluid dynamics, and is widely used in the computational fluid dynamics field due to characteristics of easy expansibility, stable and efficient parallel calculation and advanced solution method.

Figure 2:
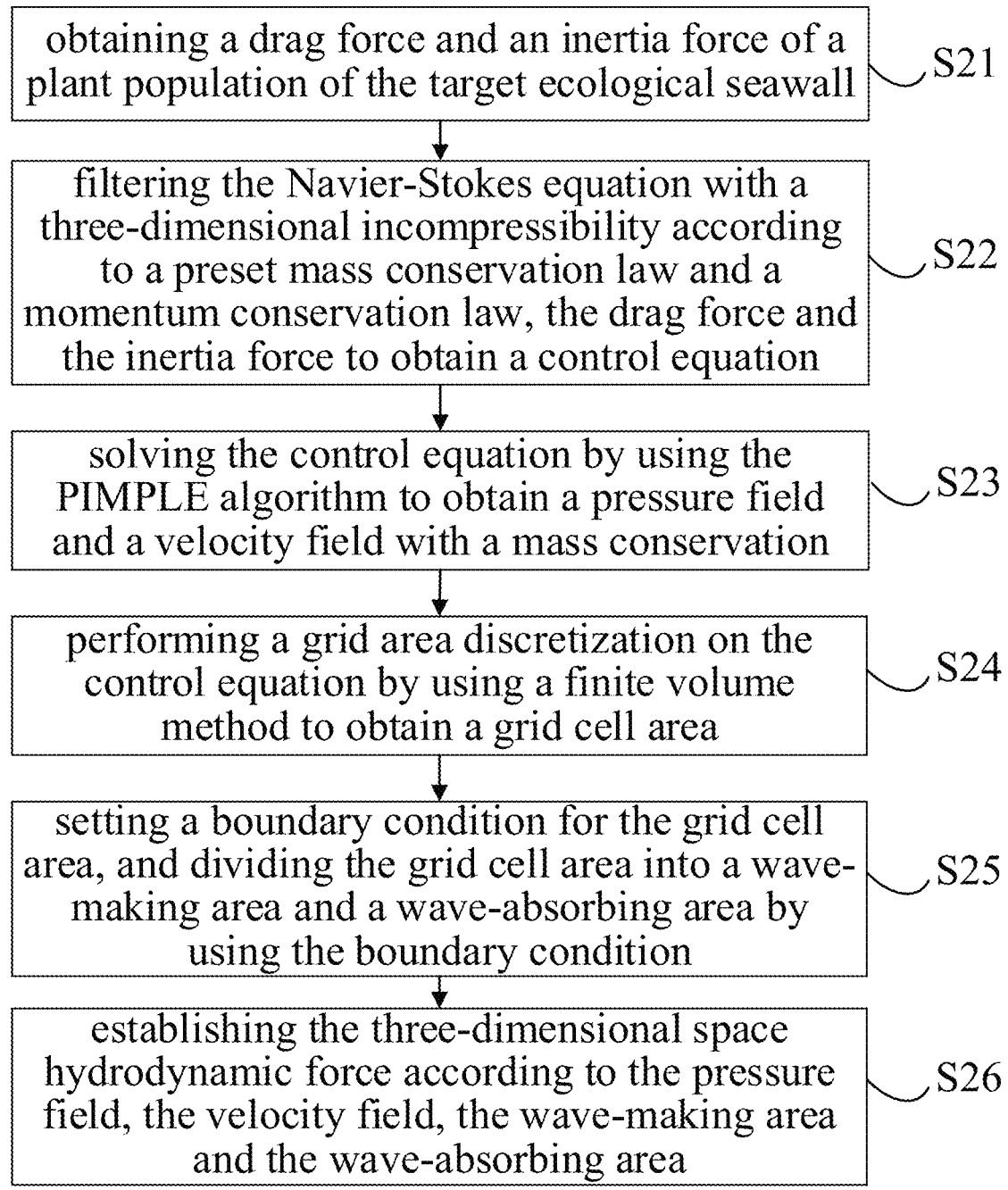
FIG. 2 is a schematic flow chart of establishing three-dimensional space hydrodynamic force provided by an embodiment of the present disclosure.

In the embodiment of the present disclosure, as shown in FIG. 2, the establishing the three-dimensional space hydrodynamic force for the target ecological seawall by using the preset Navier-Stokes equation and the preset PIMPLE algorithm includes following steps:

S21, obtaining a drag force and an inertia force of a plant population of the target ecological seawall;

S22, filtering the Navier-Stokes equation with a three-dimensional incompressibility according to a preset mass conservation law and a momentum conservation law, the drag force and the inertia force to obtain a control equation, where the control equation is:

$$\frac{\partial \langle \overline{u}_i \rangle}{\partial x_i} = 0$$

$$\frac{\partial \rho \langle \overline{u}_i \rangle}{\partial t} + \langle \overline{u}_j \rangle \frac{\partial \rho \langle \overline{u}_i \rangle}{\partial x_i} - \frac{\partial}{\partial x_j}\left[\langle u_{\mathit{eff}} \rangle \frac{\partial \langle \overline{u}_i \rangle}{\partial x_j}\right] = \frac{\partial \langle \hat{p} \rangle}{\partial x_i} - g_i x_j \frac{\partial \rho}{\partial x_j} - \overline{F}_{D,i} - \overline{F}_{1,i}$$

where $\overline{u}_i$ represents a volume average velocity, $u_{\mathit{eff}}$ represents a volume average effective viscosity, $\hat{p}$ represents the volume average dynamic pressure, $\rho$ represents a volume average density, $\overline{F}_{D,i}$ represents the drag force and $\overline{F}_{I,i}$ represents the inertia force, where the drag force and the inertia force are used to consider momentum loss caused by the vegetation in this model;

S23, solving the control equation by using the PIMPLE algorithm to obtain a pressure field and a velocity field with a mass conservation;

S24, performing a grid area discretization on the control equation by using a finite volume method to obtain a grid cell area;

S25, setting a boundary condition for the grid cell area, and dividing the grid cell area into a wave-making area and a wave-absorbing area by using the boundary condition; and S26, establishing the three-dimensional space hydrodynamic force according to the pressure field, the velocity field, the wave-making area and the wave-absorbing area.

In detail, the drag force and inertia force of the plant population of the target ecological seawall may be obtained by using a torque measuring instrument with a resistance acquisition function, where the momentum damping generated by the plant population along the river may be simulated according to coefficients of the drag force and the inertia force;

in detail, the finite volume method is used to discretize the control equation, and the calculation area is divided into finite regular or irregular micro-grid cells, and balance calculations of mass and momentum are carried out for each cell respectively. The pressure field and velocity field with mass conservation may be obtained by using the PIMPLE algorithm to discretize the equation, the conservation characteristics of the control equation are ensured. In the finite volume discretization, the Euler scheme is used to discretize the time term, and the flow field information at a certain time point may be obtained by discretizing the time term. When the water flow is fast, the required time step is small. Therefore, the PIMPLE algorithm is used to treat each time step as a steady flow. When is the solution is at a certain extent according to the steady solver, a standard Pressure Implicit Split Operator (PISO) is used to carry out a last solution on the control equation.

Specifically, according to the boundary condition, the grid area may be divided into the wave-making area and the wave-absorbing area, where numerical boundary may be used to make waves, that is, the water quality point velocity may be obtained by setting a wave analytical solution or a data solution on a fixed boundary to realize wave-making; an active wave-absorbing technology combined with the method of correcting the speed boundary may be used to absorb the wave. The purpose of wave-absorbing is mainly because the numerical wave flume is finite in length, so it is necessary to eliminate the waves propagating to the wall of the flume to avoid reflection, and also to eliminate the waves reflecting back the wave-making boundary due to the existence of structures, that is a secondary reflection.

Further, in the simulation, in order to observe the numerical wave-making effect of the viscous fluid, it is necessary to track the physical parameters of the free surface in real time. A two-phase flow solver may be used to track the fluctuation of the free surface by using VOF (Volume of Fluid) method, so as to obtain the parameters of the two-phase flow interface of liquid and gas, that is, the volume fraction a is used to represent the proportion of liquid volume in the calculation grid, $\alpha=1$ means liquid; $\alpha=0$ means gas; $0<\alpha<1$ means gas-liquid interface. In addition, when simulating waves, the waves may be severely deformed after encountering obstacles. Therefore, the modified turbulence model should be used to simulate the turbulent eddy near vegetation, and the anisotropic effect of turbulence may be considered to improve the accuracy of fast flow calculation.

S3, carrying out a wave climbing simulation on a dike body and a wave overtopping simulation on a dike top of the target ecological seawall through the three-dimensional space hydrodynamic force to obtain a wave overtopping index;

in the embodiment of the disclosure, the wave climbing simulation on the dike body of the target ecological seawall is to test the target ecological seawall at different test heights of the dike body to obtain the wave overtopping of the target ecological seawall, and further evaluate the target ecological seawall through the wave overtopping, the wave climbing and the wave overtopping are important indexes to measure the effectiveness and safety of breakwater and revetment engineering.

Figure 3:
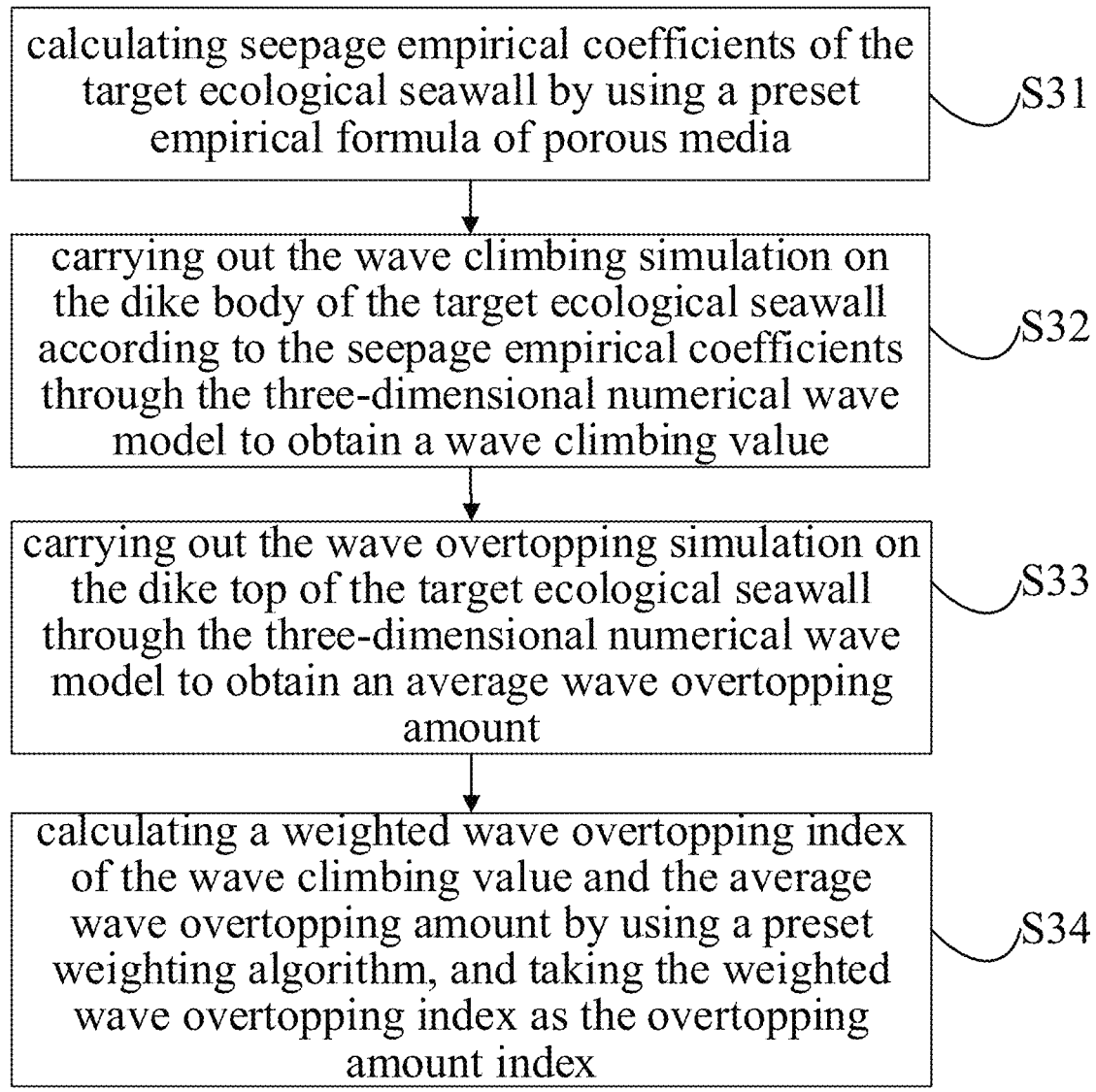
FIG. 3 is a schematic flow chart of simulating a wave overtopping index provided by an embodiment of the present disclosure.

In the embodiment of the present disclosure, as shown in FIG. 3, the carrying out the wave climbing simulation on the dike body and the wave overtopping simulation on the dike top of the target ecological seawall through the three-dimensional space hydrodynamic force to obtain the wave overtopping index includes:

S31, calculating seepage empirical coefficients of the target ecological seawall by using a preset empirical formula of porous media:

$$\alpha = \frac{41p^2}{(1-p)^{2/3}(1-(1-p)^{1/3})(1-(1-p)^{2/3})}$$

$$\beta = \frac{p^2}{(1-(1-p)^{2/3})^2}$$

where $\alpha$ represents a linear term coefficient in the seepage empirical coefficients, $\beta$ represents a nonlinear term coefficient in the seepage empirical coefficients, and p represents a porosity of a coastal bed surface;

S32, carrying out the wave climbing simulation on the dike body of the target ecological seawall according to the seepage empirical coefficients through the three-dimensional space hydrodynamic force to obtain a wave climbing value;

S33, carrying out the wave overtopping simulation on the dike top of the target ecological seawall through the three-dimensional space hydrodynamic force to obtain an average wave overtopping amount; and S34, calculating the weighted wave overtopping index of the wave climbing value and the average wave overtopping amount by using a preset weighting algorithm, and taking the weighted wave overtopping index as the wave overtopping index.

In detail, the linear term coefficient and nonlinear term coefficient obtained according to the empirical formula of porous media may be used to prepare for better simulating the wave overtopping of sloping breakwaters under real working conditions. In addition, the numerical wave flume may be constructed by using the three-dimensional space hydrodynamic force, and different wave-climbing values may be observed under different experimental wave heights during the wave climbing simulation process on the dike body of the target ecological seawall.

Specifically, with the increase of simulation time, the cumulative wave overtopping continues to increase. When the incident wave is irregular, the water quantity is not constant every time the wave overtopping occurs, and there is a maximum single wave overtopping. The average wave overtopping may be obtained by averaging the wave overtopping in the wave overtopping time. For example, when the effective wave height is 7.1 centimeters, the wave overtopping time per centimeter on the dike top is assumed to be 220 seconds, and the average wave overtopping may be obtained by averaging the wave overtopping in 20 seconds-200 seconds (100 waves).

Further, the wave climbing and the wave overtopping are important indexes to measure the effectiveness and safety of breakwater and revetment engineering. By weighted summation of the wave climbing and the average wave overtopping, different weighted wave overtopping indexes may be obtained. The larger the weighted wave overtopping index, the higher the wave overtopping index, the higher the effectiveness and safety of breakwater and revetment engineering. Conversely, the smaller the weighted wave overtopping index, the smaller the wave overtopping index, the lower the effectiveness and safety of breakwater and revetment engineering.

S4, calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

in the embodiment of the disclosure, the wave-flow bottom shear stress is a very important index in the simulation of nearshore hydrodynamic and sediment movement; the coastal hydrodynamic model adopts unstructured grids, may better describe complex coastlines or buildings, and at the same time, may locally encrypt the area; the coastal hydrodynamic model adopts an internal-external model separation algorithm, the external model calculates the water level and vertical average velocity, and the internal model calculates physical quantities such as three-dimensional velocity, temperature and salinity, so that the calculation efficiency may be effectively improved.

In the embodiment of the disclosure, the calculating the wave-flow bottom shear stress of the target ecological seawall by using the preset coastal hydrodynamic model includes:

obtaining a roughness height of sediment particles, a roughness height of a sediment transport and a roughness height of a coastal bed surface form of the target ecological seawall;

calculating a roughness height of the wave-flow bottom of the target ecological seawall by using a preset roughness height formula according to the roughness height of the sediment particles, the roughness height of the sediment transport and the roughness height of the coastal bed surface form;

$$h = h_s + h_b + h_f$$

where h represents the roughness height of the wave-flow bottom, $h_s$ represents the roughness height of the sediment particles, $h_b$ represents the roughness height of the sediment transport and $h_f$ represents the roughness height of the coastal bed surface form;

determining a pure water-flow bottom shear stress and a pure wave bottom shear stress according to the roughness height of the wave-flow bottom;

calculating the wave-flow bottom shear stress according to the pure water-flow bottom shear stress and the pure wave bottom shear stress by using a preset bottom shear stress formula:

$$\delta = \delta_s \left[ 1 + 1.2 \left( \frac{\delta_z}{\delta_s + \delta_z} \right)^{3.2} \right]$$

where $\delta$ represents the wave-flow bottom shear stress, $\delta_s$ represents the pure water-flow bottom shear stress, and $\delta_z$ represents the pure wave bottom shear stress.

In detail, the roughness height of the sediment particles, the roughness height of the sediment transport and the roughness height of the coastal bed surface form of the target ecological seawall may be obtained by a photoelectric particle analyzer with the function of sediment particle analysis, where the photoelectric particle analyzer takes multiple lines and points on the cross section for analysis respectively.

Specifically, the pure water-flow bottom shear stress is the bottom shear stress under the action of water flow, and the pure wave bottom shear stress is the bottom shear stress under the action of waves.

In the embodiment of the disclosure, the sediment movement model is realized in the coastal hydrodynamic model, and the sediment transport is calculated according to relevant wave elements and flow fields, mainly including suspended load movement and bed load movement; the sediment movement model is established according to the wave-flow bottom shear stress, and the sand ripple scale of the sediment is determined according to the wave-flow bottom shear stress to obtain the suspended load transportation motion equation, and the sediment movement model is determined according to the suspended load transportation motion equation.

In the embodiment of the disclosure, the calculating the suspended load sediment transportation volume according to the wave-flow bottom shear stress includes:

obtaining a direction vector of the wave-flow bottom shear stress;

calculating the bed load sediment transportation according to the direction vector by using a preset sediment transport rate formula:

$$q = \sqrt{q_x \frac{\delta_{sx}}{\delta_s} + q_y \frac{\delta_{sy}}{\delta_s}}$$

where q is the bed load sediment transportation, $q_x$ represents a bed load sediment transportation volume in the direction of x, $q_y$ represents a bed load sediment transportation volume in the direction of y, $\delta_{sx}$ represents a direction vector of pure water-flow bottom shear stress in the direction of x, and $\delta_{sy}$ represents a direction vector of pure water-flow bottom shear stress in the direction of y, and $\delta_s$ represents the pure water-flow bottom shear stress.

In detail, the source sink item of the target ecological seawall is composed of scouring flux and silting flux. According to the sediment movement model, the suspended load sediment transportation volume in upper layer with upward diffusion of sediment and the bed load sediment transportation volume in lower layer with downward diffusion of sediment may be determined, and the suspended load sediment transportation volume may be obtained by adding the suspended load sediment transportation volume in upper layer and the bed load sediment transportation volume in lower layer.

Specifically, the bed load sediment transportation volume refers to the bed load sediment volume passing through the river section in unit time, and is often expressed by the sediment quality, and the bed load sediment quality of the whole river section may be determined according to the direction vector of the wave-flow bottom shear stress.

In the embodiment of the disclosure, the calculating the suspended load sediment transportation volume by using the preset convection-diffusion equation includes:

obtaining a sediment carrying volume and a water flow velocity in a water flow movement process;

calculating a sediment mass concentration in the water flow movement process by using the convection-diffusion equation according to the sediment carrying volume and the water flow velocity:

$$\frac{\partial B_A}{\partial \tau} + u_x \frac{\partial B_A}{\partial x} + u_y \frac{\partial B_A}{\partial y} + u_z \frac{\partial B_A}{\partial z} = \left( \frac{\partial^2 B_A}{\partial x^2} + \frac{\partial^2 B_A}{\partial y^2} + \frac{\partial^2 B_A}{\partial z^2} \right) + r_A$$

where $r_A$ represents the sediment carrying volume, $B_A$ represents the sediment mass concentration, $\tau$ represents a water flow time, $u_x$ represents a water flow velocity in a direction of x, $u_y$ represents a water flow velocity in a direction of y, $u_z$ represents a water flow velocity in a direction of z, and $\partial$ represents a partial derivative function; and determining the suspended load sediment transportation volume according to the sediment mass concentration.

In detail, the sediment carrying volume and flow velocity in the process of water flow movement may be estimated by obtaining the sediment carrying volume and water flow velocity in regional water flow.

Specifically, the convection-diffusion equation represents the mass transfer law of the flow system. The first term at the right end of the convection-diffusion equation is the diffusion term, and the second term at the left end of the convection-diffusion equation is the convection term, the convection and the diffusion are the changing processes of some physical quantity carried by fluid. Therefore, the concentration distribution in the process of water flow movement may be obtained by solving the convection-diffusion, so that the suspended load sediment transportation volume on the bed surface may be determined.

S5, mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and In the embodiment of the disclosure, the three-dimensional space hydrodynamic force is mapped to the two-dimensional bed surface by using the finite area method, so that the change of the tidal flats in front of the dike may be further determined according to the change of the bed surface, so that the ecological seawall may affect the coastal dynamic transmission process after the bed surface change, so that the four processes of coastal dynamic transmission, dynamic weakening, suspended sediment deposition and bed surface change may be fully coupled, and are consistent with the actual situation.

In the embodiment of the disclosure, the coastal bed surface change index is the sum of the change caused by the suspended load movement and the change caused by the bed load movement.

In the embodiment of the disclosure, the calculating the two-dimensional bed surface change index according to the suspended load sediment transportation volume and the bed load sediment transportation volume includes:

determining a sediment exchange volume in the vertical direction according to the suspended load sediment transportation volume;

determining the sediment transportation volume in the horizontal direction according to the bed load sediment transportation volume;

calculating a coastal bed surface change index according to the sediment exchange volume and the sediment transportation volume by using a preset coastal bed surface change formula:

$$C = (1-p)\frac{\partial h_k}{\partial 1} + f\left( \frac{\partial q_x}{\partial x} + \frac{\partial q_y}{\partial y} + E + D \right)$$

where C represents the coastal bed surface change index, p represents the porosity of the coastal bed surface, $h_k$ represents an elevation of the coastal bed surface, $\partial$ represents a partial derivative sign, f represents a terrain acceleration factor, 1 represents a time step, $q_x$ represents a bed load sediment transportation volume in the direction of x, $q_y$ represents a bed load sediment transportation volume in the direction of y, E represents the sediment exchange volume and D represents the sediment transportation volume.

In detail, the transportation of each sediment component is determined by suspended load sediment transport and bed load sediment transport. Where the suspended load sediment transport leads to a vertical sediment exchange between the top layer of the bed and the water body, while the bed load sediment transport leads to a horizontal sediment transport in the top layer of the bed. After the sediment transport is calculated, thicknesses of the active layer and the bottom bed are recalculated, and finally the variables of the bottom bed surface (such as sediment properties) are updated.

In the embodiment of the disclosure, the development index of tidal flats in front of dike of the target ecological seawall refer to the area of the tidal flats in front of dike, the change trend of erosion and deposition of the tidal flats in front of the dike, and the coastal tidal flats have multiple functions of flood storage and drought resistance, seawall stabilization, storm surge invasion buffering, soil erosion control and the like, so the erosion and deposition change of the tidal flats in front of the dike is of great significance to the development and management of the coastal zone, engineering construction and ecosystem protection.

In the embodiment of the disclosure, the determining the development index of the tidal flats in front of dike of the target ecological seawall by using the preset Exner equation according to the two-dimensional bed surface change index includes:

determining a bed surface change value of the target ecological seawall according to the two-dimensional bed surface change index;

calculating the development index of the tidal flats in front of dike of the target ecological seawall according to the bed surface change value by using the Exner equation:

$$\frac{\partial \eta}{\partial \Lambda} = -\frac{1}{1-p} \cdot q + \sigma$$

where $\eta$ represents the development index of the tidal flats in front of dike, $\Lambda$ represents a tidal flat development time, p represents the porosity of the coastal bed surface, q represents the bed surface change value, σ represents a constant, generally a positive value, and ∂ represents the partial derivative function.

In detail, the larger the bed surface change value indicates that the sediment change of the target ecological seawall is very large, that is, the scouring and silting phenomenon depositing sediment occurs on the seawall surface; in addition, when the sediment variation is relatively large, the tidal flat area in front of the target ecological seawall also increases, that is, when the sediment increases, the tidal flat area in front of the target ecological seawall increases, and conversely, when the sediment decreases, the tidal flat area in front of the target ecological seawall also decreases.

Specifically, the increasing tidal flats in front of the dike indicates that the development index of the tidal flats in front of dike of the target ecological seawall is better; the decreasing tidal flats in front of the dike indicates that the development index of the tidal flats in front of dike of the target ecological seawall becomes worse, and the efficiency of coastal zone development management, engineering construction and ecosystem protection is lower.

Further, the Exner equation describes the mass conservation theorem of the sediment transport process of rivers under the action of rivers. The height of the river bottom increases gradually with the accumulated sediments, and also gradually decreases with the sediments. According to the change of bed surface with time, the development of the tidal flat also changes with time.

S6, calculating a disaster prevention and mitigation effectiveness grade of the target ecological seawall according to the wave overtopping index and the development index of the tidal flats in front of the dike.

In the embodiment of the disclosure, the disaster prevention and mitigation effectiveness grade refers to the evaluation of the disaster prevention and mitigation effectiveness of the target ecological seawall according to the wave overtopping index and the development index of the tidal flats in front of the dike, and the higher the disaster prevention and mitigation effectiveness grade, the better the disaster prevention and mitigation effectiveness of the target ecological seawall.

In the embodiment of the disclosure, the calculating the disaster prevention and mitigation effectiveness grade of the target ecological seawall according to the wave overtopping index and the development index of tidal flats in front of dike of the target ecological seawall includes:
  determining a first weight of the wave overtopping index and a second weight of the development index of the tidal flats in front of dike by using a preset analytic hierarchy process;
  calculating a weighted mean of the first weight and the second weight by using a weighted mean algorithm; and
  determining the disaster prevention and mitigation effectiveness grade of the target ecological seawall according to the weighted mean.

In detail, the analytic hierarchy process (AHP) refers to the decision-making method decomposing the elements always related to decision-making into levels such as objectives, criteria and schemes, and then carrying out qualitative and quantitative analysis on this basis, and is a hierarchical weight decision-making analysis method. Firstly, determining the characteristic matrix of the wave overtopping index by using the analytic hierarchy process; then calculating a weight vector of the characteristic matrix; and finally normalizing the weight vector to obtain the first weight of the wave overtopping index.

For example, the weighted mean within a numerical range of 0-50 indicates that the disaster prevention and mitigation effectiveness level of the target ecological seawall is low; the weighted mean within a numerical range of 50-80 indicates that the disaster prevention and mitigation effectiveness level of the target ecological seawall is medium; the weighted mean within a numerical range of 80-100 indicates that the disaster prevention and mitigation effectiveness level of the target ecological seawall is high.

Figure 4:
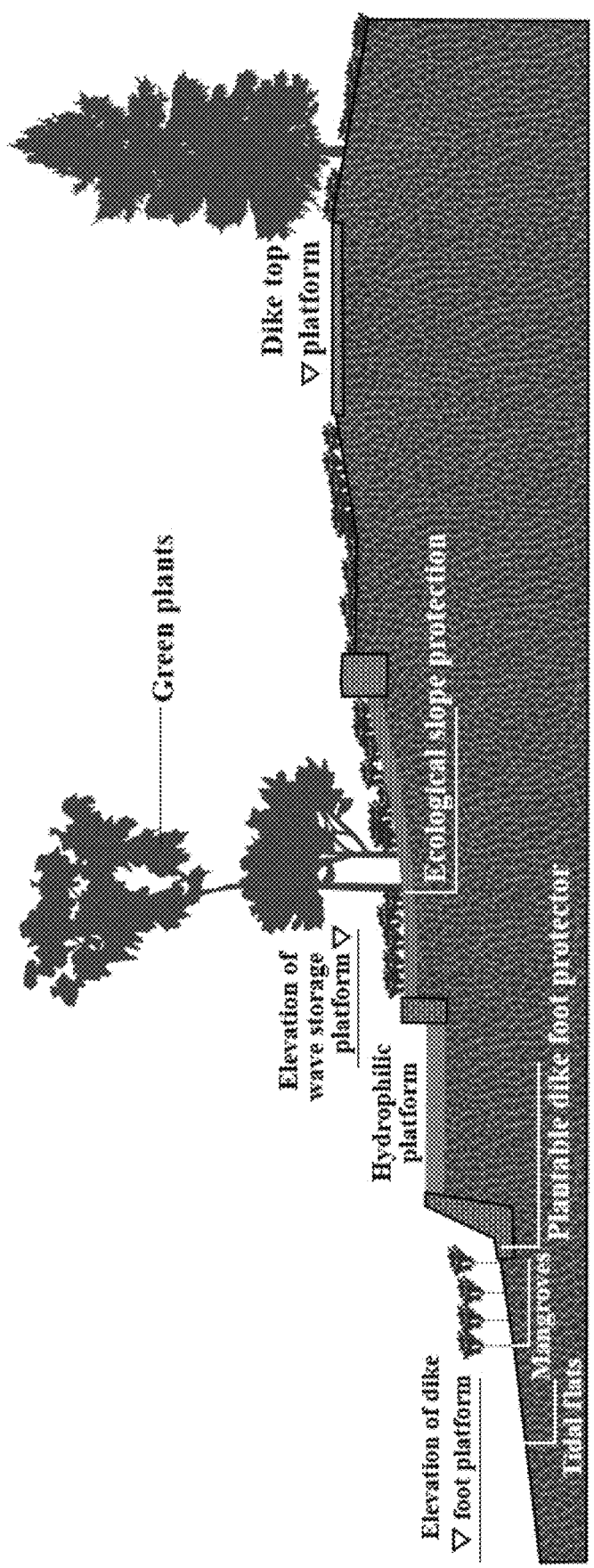
FIG. 4 is a schematic diagram of an application scenario provided by an embodiment of the present disclosure.

According to the embodiment, the seawall ecologicalization may be performed on the target ecological seawall, and then the three-dimensional space hydrodynamic force may be established for the target ecological seawall, and the wave climbing simulation on the dike body and the wave overtopping simulation on the dike top of the target ecological seawall may be carried out for the target ecological seawall through the three-dimensional space hydrodynamic force, so that the effectiveness and safety of the breakwater and revetment engineering may be measured according to the wave overtopping index, and a sediment movement model may be established according to the wave-flow bottom shear stress of the target ecological seawall, and after the sediment movement model is calculated, the suspended load sediment transportation volume and the bed load sediment transportation volume are transmitted to a terrain evolution model to determine the coastal bed surface change index, and then the development index of tidal flats in front of dike of the target ecological seawall is determined according to the coastal bed surface change index, and the disaster prevention and mitigation effectiveness grade of the target ecological seawall is judged according to the wave overtopping index and the development index of the tidal flats in front of dike, so that the disaster prevention and mitigation effectiveness of the target ecological seawall may be improved. Therefore, the method, the device, the electronic equipment and the computer-readable storage medium for analyzing the disaster prevention and mitigation effectiveness of the ecological seawall provided by the embodiment may solve the problem of the low efficiency in the disaster prevention and mitigation of the ecological seawall. A schematic diagram of an application scenario of one embodiment is shown in FIG. 4.

Figure 5:
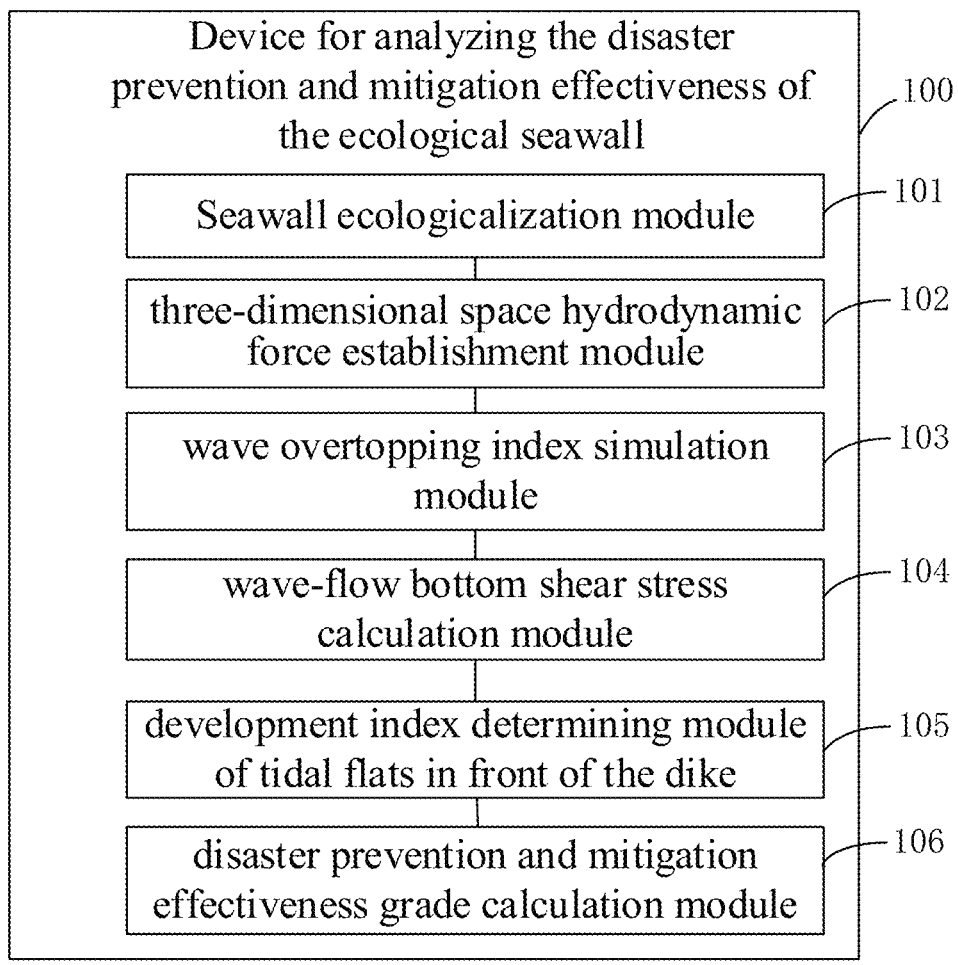
FIG. 5 is a functional module diagram of a device for analyzing a disaster prevention and mitigation effectiveness of an ecological seawall provided by an embodiment of the present disclosure.

A device for analyzing a disaster prevention and mitigation effectiveness of an ecological seawall provided by an embodiment of the present disclosure is shown in FIG. 5.

The device for analyzing a disaster prevention and mitigation effectiveness of an ecological seawall 100 may be installed in the electronic equipment. According to the realized functions, the device for analyzing the disaster prevention and mitigation effectiveness of the ecological seawall 100 may include a seawall ecologicalization module 101, a three-dimensional space hydrodynamic force establishment module 102, a wave overtopping index simulation module 103, a wave-flow bottom shear stress calculation module 104, a development index determining module of tidal flats in front of dike 105 and a disaster prevention and mitigation effectiveness grade calculation module 106. The modules of the present disclosure may also be called units, referring to a series of computer program segments that may be executed by the processor of electronic equipment and may complete fixed functions, and are stored in the memory of the electronic equipment.

In this embodiment, the functions of each module/unit are as follows:
  the seawall ecologicalization module 101 used for performing a seawall ecologicalization on a target seawall by using preset vegetations, environment-friendly materials and ecological engineering methods to obtain a target ecological seawall;

the three-dimensional space hydrodynamic force establishment module 102 used for establishing three-dimensional space hydrodynamic force for the target ecological seawall by using a preset Navier-Stokes equation and a preset PIMPLE algorithm;

the wave overtopping index simulation module 103 used for carrying out a wave climbing simulation on a dike body and a wave overtopping simulation on a dike top of the target ecological seawall through the three-dimensional space hydrodynamic force to obtain a wave overtopping index;

the wave-flow bottom shear stress calculation module 104 used for calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

the development index determining module of tidal flats in front of dike 105 used for mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and The disaster prevention and mitigation effectiveness level calculation module 106 is used to calculate the disaster prevention and mitigation effectiveness level of the target ecological seawall according to the wave overtopping index and the beach development index in front of the seawall.

In detail, each module in the device for analyzing the disaster prevention and mitigation effectiveness of the ecological seawall 100 described in the embodiment of the present disclosure adopts the same technical means as the method for analyzing the disaster prevention and mitigation effectiveness of the ecological seawall described in FIG. 1, FIG. 2 and FIG. 3, and may produce the same technical effects, so no more details here.

Figure 6:
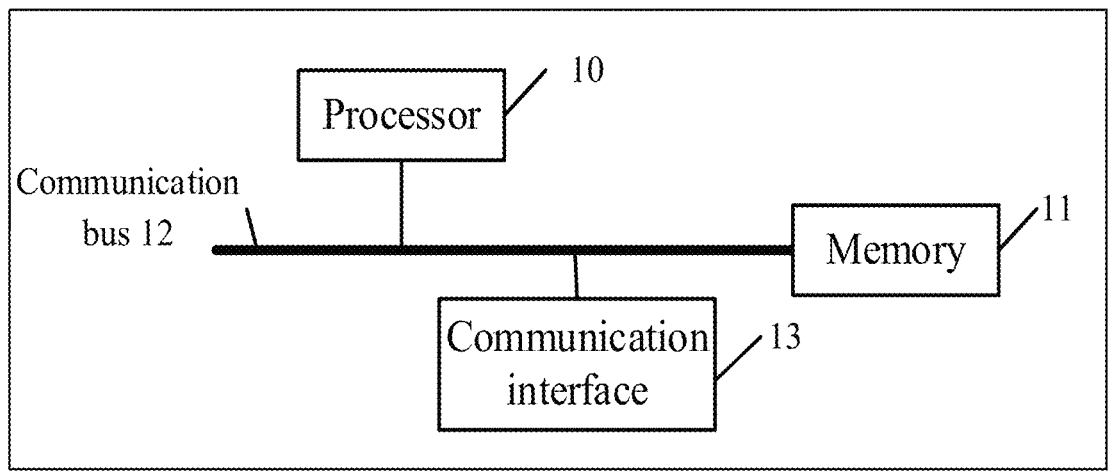
FIG. 6 is a schematic structural diagram of electronic equipment for executing the method for analyzing the disaster prevention and mitigation effectiveness of the ecological seawall according to an embodiment of the present disclosure.

A schematic structural diagram of electronic equipment for executing the method for analyzing the disaster prevention and mitigation effectiveness of the ecological seawall provided by an embodiment of the present disclosure is shown in FIG. 6.

The electronic equipment may include a processor 10, a memory 11, a communication bus 12 and a communication interface 13, and may also include a computer program stored in the memory 11 and running on the processor 10, such as a program for analyzing the disaster prevention and mitigation effectiveness of the ecological seawall.

In some embodiments, the processor 10 may be composed of integrated circuits, for example, a single packaged integrated circuit, or a plurality of integrated circuits packaged with the same function or different functions, including one or more Central Processing unit (CPU), microprocessors, digital processing chips, graphics processors and combinations of various control chips. The processor 10 is the Control Unit of the electronic equipment, connects all components of the whole electronic equipment with various interfaces and lines, and executes various functions and processes data of the electronic equipment by running or executing programs or modules stored in the memory 11 (for example, executing the program for analyzing the disaster prevention and mitigation effectiveness of the ecological seawall, etc.) and calling the data stored in the memory 11.

The memory 11 includes at least one type of readable storage medium, the readable storage medium includes flash memory, mobile hard disk, multimedia card, card memory (such as SD or DX memory), magnetic memory, magnetic disk, optical disk, etc. In some embodiments, the memory 11 may be an internal storage unit of electronic equipment, such as a mobile hard disk of the electronic equipment. In other embodiments, the memory 11 may also be an external storage device of electronic equipment, such as a plug-in mobile hard disk, a Smart Media Card (SMC), a Secure Digital (SD) card, a Flash Card, and the like. Further, the memory 11 may also include both an internal storage unit and an external storage device of the electronic equipment. The memory 11 may not only be used to store application software and various data installed in the electronic equipment, such as the code of the program for analyzing the disaster prevention and mitigation effectiveness of the ecological seawall, but also be used to temporarily store the output data and the data to be output.

The communication bus 12 may be a peripheral component interconnect (PCI) bus or an extended industry standard architecture (EISA) bus. The bus may be divided into address bus, data bus and control bus. The bus is set to realize connection communication between the memory 11 and at least one processor 10, etc.

The communication interface 13 is used for communication between the electronic equipment and other devices, including a network interface and a user interface. Alternatively, the network interface may include a wired interface and/or a wireless interface (such as a WI-FI interface, a Bluetooth interface, etc.), and is usually used to establish communication connection between the electronic equipment and other electronic equipment. The user interface may be a Display, an input unit (such as a Keyboard), and optionally, the user interface may also be a standard wired interface or a wireless interface. Alternatively, in some embodiments, the display may be an LED display, a liquid crystal display, a touch-sensitive liquid crystal display, an OLED (Organic Light-Emitting Diode) touch device and the like. Where the display may also be properly called a display screen or a display unit used to display the information processed in the electronic equipment and to display a visual user interface.

Only electronic equipment with components is shown in the FIG. 6, and those skilled in the art may understand that the structure shown in the figure is not limited to the electronic equipment, and may include fewer or more components than shown, or combine some components, or have different component arrangements.

For example, although not shown, the electronic equipment may further include a power supply (such as a battery) for supplying power to various components. Preferably, the power supply may be logically connected with the at least one processor 10 through a power management device, so that functions such as charging management, discharging management, and power consumption management may be realized through the power management device. The power supply may also include one or more DC or AC power supplies, recharging devices, power failure detection circuits, power converters or inverters, power status indicators and other arbitrary components. The electronic equipment may also include various sensors, Bluetooth modules, Wi-Fi modules, etc., and no more details here.

It should be understood that the embodiment is only for illustration, and the scope of patent application is not limited by this structure.

The program for analyzing the disaster prevention and mitigation effectiveness of the ecological seawall stored in the memory 11 in the electronic equipment is a combination of multiple instructions, and when the program for analyzing the disaster prevention and mitigation effectiveness of the ecological seawall is run in the processor 10, the following may be realized:

performing a seawall ecologicalization on a target seawall by using preset vegetations, environment-friendly materials and ecological engineering methods to obtain a target ecological seawall;

establishing three-dimensional space hydrodynamic force for the target ecological seawall by using a preset Navier-Stokes equation and a preset PIMPLE algorithm;

carrying out a wave climbing simulation on a dike body and a wave overtopping simulation on a dike top of the target ecological seawall through the three-dimensional space hydrodynamic force to obtain a wave overtopping index;

calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and calculating a disaster prevention and mitigation effectiveness grade of the target ecological seawall according to the wave overtopping index and the development index of the tidal flats in front of dike.

Specifically, the specific implementation method of the above instructions by the processor 10 may refer to the description of relevant steps in the corresponding embodiment of the attached drawings, and is not repeated here.

Further, the integrated module/unit of the electronic equipment may be stored in a computer-readable storage medium if it is realized in the form of a software functional unit and sold or used as an independent product. The computer-readable storage medium may be volatile or non-volatile. For example, the computer-readable medium may include any entity, device recording medium, U disk, mobile hard disk, magnetic disk, optical disk, computer memory, and Read-Only Memory (ROM) capable of carrying the computer program code.

The present disclosure also provides a computer-readable storage medium, a computer program is stored in the computer-readable storage medium, when the computer program is executed by the processor of the electronic equipment, the following may be realized:

performing a seawall ecologicalization on a target seawall by using preset vegetations, environment-friendly materials and ecological engineering methods to obtain a target ecological seawall;

establishing three-dimensional space hydrodynamic force for the target ecological seawall by using a preset Navier-Stokes equation and a preset PIMPLE algorithm;

carrying out a wave climbing simulation on a dike body and a wave overtopping simulation on a dike top of the target ecological seawall through the three-dimensional space hydrodynamic force to obtain a wave overtopping index;

calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and calculating a disaster prevention and mitigation effectiveness grade of the target ecological seawall according to the wave overtopping index and the development index of the tidal flats in front of dike.

In several embodiments provided by the present disclosure, it should be understood that the disclosed devices, devices and methods may be realized in other ways. For example, the device embodiment described above is only schematic. For example, the division of the module is only a logical function division, and there may be another division method in actual implementation.

The modules described as separate components may or may not be physically separated, and the components displayed as modules may or may not be physical units, that is, may be located in one place or distributed to multiple network units. Some or all of the modules may be selected according to actual needs to achieve the purpose of this embodiment.

In addition, each functional module in each embodiment of the present disclosure may be integrated in one processing unit, or each unit may exist physically alone, or two or more units may be integrated in one unit. The above integrated units may be realized in the form of hardware, or in the form of hardware plus software functional modules.

It is obvious to those skilled in the art that the present disclosure is not limited to the details of the above-mentioned exemplary embodiments, but may be realized in other specific forms without departing from the spirit or essential characteristics of the present disclosure.

Therefore, the embodiments should be considered in all aspects as illustrative and not restrictive, and the scope of the disclosure is defined by the appended claims rather than the above description, so it is intended to embrace all changes that fall within the meaning and range of equivalents of the claims. Any accompanying drawings in the claims shall not be regarded as limiting the related claims.

The embodiment of the disclosure may acquire and process related data based on artificial intelligence technology. Where Artificial Intelligence (AI) is a theory, method, technology and application system using digital computers or machines controlled by digital computers to simulate, extend and expand human intelligence, perceive the environment, acquire knowledge and use knowledge to obtain the best results.

In addition, it is obvious that the word "comprising" does not exclude other elements or steps, and the singular does not exclude the plural. A plurality of units or devices stated in the system claims may also be realized by one unit or device through software or hardware. The "first" and "second" words are used to indicate names, but do not indicate any particular order.

Finally, it should be noted that the above embodiments are only used to illustrate the technical scheme of the present disclosure, but not to limit it. Although the present disclosure has been described in detail with reference to the preferred embodiments, those skilled in the art should understand that the technical scheme of the present disclosure may be modified or replaced by equivalents without departing from the spirit and scope of the technical scheme of the present disclosure.

What is claimed is:

1. A method for analyzing a disaster prevention and mitigation effectiveness of an ecological seawall, comprising:

performing a seawall ecologicalization on a target seawall by using preset vegetations, environment-friendly materials and ecological engineering methods to obtain a target ecological seawall;

establishing three-dimensional space hydrodynamic force for the target ecological seawall by using a preset Navier-Stokes equation and a preset PIMPLE algorithm, wherein the establishing the three-dimensional space hydrodynamic force for the target ecological seawall by using the preset Navier-Stokes equation and the preset PIMPLE algorithm comprises:

obtaining a drag force and an inertia force of a plant population of the target ecological seawall;

filtering the Navier-Stokes equation with a three-dimensional incompressibility according to a preset mass conservation law and a momentum conservation law, the drag force and the inertia force to obtain a control equation, wherein the control equation is:

$$\frac{\partial \langle \bar{u}_i \rangle}{\partial x_i} = 0$$

$$\frac{\partial \rho \langle \bar{u}_i \rangle}{\partial t} + \langle \bar{u}_j \rangle \frac{\partial \rho \langle \bar{u}_i \rangle}{\partial x_i} - \frac{\partial}{\partial x_j}\left[\langle u_{\it{eff}} \rangle \frac{\partial \langle \bar{u}_i \rangle}{\partial x_j}\right] = \frac{\partial \langle \acute{p} \rangle}{\partial x_i} - g_i x_j \frac{\partial \rho}{\partial x_j} - \overline{F}_{D,i} - \overline{F}_{I,i};$$

wherein $\bar{u}_i$ represents a volume average velocity, $u_{\it{eff}}$ represents a volume average effective viscosity, $\acute{p}$ represents the volume average dynamic pressure, $\rho$ represents a volume average density, $\overline{F}_{D,i}$ represents the drag force and $\overline{F}_{I,i}$ represents the inertia force, $x_i$ represents an i-th horizontal component of a velocity, $x_j$ represents a j-th vertical component of the velocity, $g_i$ represents a gravitational acceleration of the i-th component, t represents a fluid flow time, $\rho\{\bar{u}_i\}$ represents a fluid volume density at an average velocity of a horizontal volume component, $\bar{u}_j$ represents an average velocity of a volume vertical component, wherein the drag force and the inertia force are used to consider momentum loss caused by the vegetations in this model;

solving the control equation by using the PIMPLE algorithm to obtain a pressure field and a velocity field with a mass conservation;

performing a grid area discretization on the control equation by using a finite volume method to obtain a grid cell area;

setting a boundary condition for the grid cell area, and dividing the grid cell area into a wave-making area and a wave-absorbing area by using the boundary condition; and establishing the three-dimensional space hydrodynamic force according to the pressure field, the velocity field, the wave-making area and the wave-absorbing area;

carrying out a wave climbing simulation on a dike body and a wave overtopping simulation on a dike top of the target ecological seawall through the three-dimensional space hydrodynamic force to obtain a wave overtopping index;

calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;

mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and calculating a disaster prevention and mitigation effectiveness grade of the target ecological seawall according to the wave overtopping index and the development index of the tidal flats in front of dike.

2. The method for analyzing the disaster prevention and mitigation effectiveness of the ecological seawall according to claim 1, wherein carrying out the wave climbing simulation on the dike body and the wave overtopping simulation on the dike top of the target ecological seawall through the three-dimensional space hydrodynamic force to obtain the wave overtopping index comprises:

calculating seepage empirical coefficients of the target ecological seawall by using a preset empirical formula of porous media:

$$\alpha = \frac{41p^2}{(1-p)^{2/3}(1-(1-p)^{1/3})(1-(1-p)^{2/3})}$$

$$\beta = \frac{p^2}{(1-(1-P)^{2/3})^2};$$

wherein α represents a linear term coefficient in the seepage empirical coefficients, β represents a nonlinear term coefficient in the seepage empirical coefficients, and p represents a porosity of a coastal bed surface;

carrying out the wave climbing simulation on the dike body of the target ecological seawall according to the seepage empirical coefficients through the three-dimensional space hydrodynamic force to obtain a wave climbing value;

carrying out the wave overtopping simulation on the dike top of the target ecological seawall through the three-dimensional space hydrodynamic force to obtain an average wave overtopping amount; and calculating a weighted wave overtopping index of the wave climbing value and the average wave overtopping amount by using a preset weighting algorithm, and taking the weighted wave overtopping index as the wave overtopping index.

3. The method for analyzing the disaster prevention and mitigation effectiveness of the ecological seawall according to claim 1, wherein the calculating the wave-flow bottom shear stress of the target ecological seawall by using the preset coastal hydrodynamic model comprises:

obtaining a roughness height of sediment particles, a roughness height of a sediment transport and a roughness height of a coastal bed surface form of the target ecological seawall;

calculating a roughness height of the wave-flow bottom of the target ecological seawall by using a preset roughness height formula according to the roughness height of the sediment particles, the roughness height of the sediment transport and the roughness height of the coastal bed surface form;

$$h = h_s + h_b + h_f;$$

wherein h represents the roughness height of the wave-flow bottom, $h_s$ represents the roughness height of the sediment particles, $h_b$ represents the roughness height of the sediment transport and $h_f$ represents the roughness height of the coastal bed surface form;

determining a pure water-flow bottom shear stress and a pure wave bottom shear stress according to the roughness height of the wave-flow bottom; and calculating the wave-flow bottom shear stress according to the pure water-flow bottom shear stress and the pure wave bottom shear stress by using a preset bottom shear stress formula:

$$\delta = \delta_s \left[ 1 + 1.2 \left( \frac{\delta_z}{\delta_s + \delta_z} \right)^{3.2} \right];$$

wherein δ represents the wave-flow bottom shear stress, $\delta_s$ represents the pure water-flow bottom shear stress, and $\delta_z$ represents the pure wave bottom shear stress.

4. The method for analyzing the disaster prevention and mitigation effectiveness of the ecological seawall according to claim 1, wherein the calculating the suspended load sediment transportation volume by using the preset convection-diffusion equation comprises:

obtaining a sediment carrying volume and a water flow velocity in a water flow movement process;

calculating a sediment mass concentration in the water flow movement process by using the convection-diffusion equation according to the sediment carrying volume and the water flow velocity:

$$\frac{\partial B_A}{\partial \tau} + u_x \frac{\partial B_A}{\partial x} + u_y \frac{\partial B_A}{\partial y} + u_z \frac{\partial B_A}{\partial z} = \left( \frac{\partial^2 B_A}{\partial x^2} + \frac{\partial^2 B_A}{\partial y^2} + \frac{\partial^2 B_A}{\partial z^2} \right) + r_A$$

wherein $r_A$ represents the sediment carrying volume, $B_A$ represents the sediment mass concentration, τ represents a water flow time, $u_x$ represents a water flow velocity in a direction of x, $u_y$ represents a water flow velocity in a direction of y, $u_z$ represents a water flow velocity in a direction of z, and ∂ represents a partial derivative function; and determining the suspended load sediment transportation volume according to the sediment mass concentration.

5. The method for analyzing the disaster prevention and mitigation effectiveness of the ecological seawall according to claim 1, wherein the calculating the two-dimensional bed surface change index according to the suspended load sediment transportation volume and the bed load sediment transportation volume comprises:

determining a sediment exchange volume in the vertical direction according to the suspended load sediment transportation volume;

determining the sediment transportation volume in the horizontal direction according to the bed load sediment transportation volume; and calculating a coastal bed surface change index according to the sediment exchange volume and the sediment transportation volume by using a preset coastal bed surface change formula:

$$C = (1-p) \frac{\partial h_k}{\partial 1} + f \left( \frac{\partial q_x}{\partial x} + \frac{\partial q_y}{\partial y} + E + D \right);$$

wherein C represents the coastal bed surface change index, p represents the porosity of the coastal bed surface, $h_k$ represents an elevation of the coastal bed surface, ∂ represents a partial derivative sign, f represents a terrain acceleration factor, l represents a time step, $q_x$ represents a bed load sediment transportation volume in the direction of x, $q_y$ represents a bed load sediment transportation volume in the direction of y, E represents the sediment exchange volume and D represents the sediment transportation volume.

6. The method for analyzing the disaster prevention and mitigation effectiveness of the ecological seawall according to claim 1, wherein the determining the development index of the tidal flats in front of dike of the target ecological seawall by using the preset Exner equation according to the two-dimensional bed surface change index comprises:

determining a bed surface change value of the target ecological seawall according to the two-dimensional bed surface change index; and calculating the development index of the tidal flats in front of dike of the target ecological seawall according to the bed surface change value by using the Exner equation:

$$\frac{\partial \eta}{\partial \Lambda} = -\frac{1}{1-P} \cdot q + \sigma;$$

wherein η represents the development index of the tidal flats in front of dike, Λ represents a tidal flat development time, p represents the porosity of the coastal bed surface, q represents the bed surface change value, σ represents a constant, and ∂ represents the partial derivative function.

7. The method for analyzing the disaster prevention and mitigation effectiveness of the ecological seawall according to claim 1, wherein the calculating the disaster prevention and mitigation effectiveness grade of the target ecological seawall according to the wave overtopping index and the development index of the tidal flats in front of dike comprises:
   determining a first weight of the wave overtopping index and a second weight of the development index of the tidal flats in front of dike by using a preset analytic hierarchy process;
   calculating a weighted mean of the first weight and the second weight by using a weighted mean algorithm; and
   determining the disaster prevention and mitigation effectiveness grade of the target ecological seawall according to the weighted mean.

8. A device for analyzing a disaster prevention and mitigation effectiveness of an ecological seawall, comprising:
   a seawall ecologicalization module used for performing a seawall ecologicalization on a target seawall by using preset vegetations, environment-friendly materials and ecological engineering methods to obtain a target ecological seawall;
   a three-dimensional space hydrodynamic force establishment module used for establishing three-dimensional space hydrodynamic force for the target ecological seawall by using a preset Navier-Stokes equation and a preset PIMPLE algorithm;
   a wave overtopping index simulation module used for carrying out a wave climbing simulation on a dike body and a wave overtopping simulation on a dike top of the target ecological seawall through the three-dimensional space hydrodynamic force to obtain a wave overtopping index;
   a wave-flow bottom shear stress calculation module used for calculating a wave-flow bottom shear stress of the target ecological seawall by using a preset coastal hydrodynamic model, calculating a bed load sediment transportation volume according to the wave-flow bottom shear stress, and calculating a suspended load sediment transportation volume by using a preset convection-diffusion equation;
   a development index determining module of tidal flats in front of dike used for mapping the three-dimensional space hydrodynamic force to a two-dimensional bed surface by using a preset finite area method, calculating a two-dimensional bed surface change index according to the suspended load sediment transportation volume and the bed load sediment transportation volume, and determining a development index of tidal flats in front of dike of the target ecological seawall by using a preset Exner equation according to the two-dimensional bed surface change index; and
   a disaster prevention and mitigation effectiveness grade calculation module used for calculating a disaster prevention and mitigation effectiveness grade of the target ecological seawall according to the wave overtopping index and the development index of the tidal flats in front of dike.

9. Electronic equipment, comprising:
at least one processor; and
a memory communicatively connected to the at least one processor;
wherein the memory stores a computer program executable by the at least one processor, and the computer program is executed by the at least one processor, so the at least one processor is capable of executing the method for analyzing the disaster prevention and mitigation effectiveness of the ecological seawall according to claim 1.

\* \* \* \* \*